(12) United States Patent
Xin et al.

(10) Patent No.: US 8,032,193 B2
(45) Date of Patent: Oct. 4, 2011

(54) ELECTRONIC DEVICE WITH MOVABLE HOUSING PARTS

(75) Inventors: Liu Xin, Beijing (CN); Liu Jikun, Beijing (CN); Wang Miao, Liao Ning Province (CN); Liu Ying, Beijing (CN)

(73) Assignee: Nokia Corporation, Espoo (FI)

( * ) Notice: Subject to any disclaimer, the term of this patent is extended or adjusted under 35 U.S.C. 154(b) by 563 days.

(21) Appl. No.: 12/175,594

(22) Filed: Jul. 18, 2008

(65) Prior Publication Data

US 2010/0016041 A1    Jan. 21, 2010

(51) Int. Cl.
*H04M 1/00*    (2006.01)

(52) U.S. Cl. .............. 455/575.4; 455/575.1; 455/575.8; 455/412.2; 379/330

(58) Field of Classification Search .............. 455/575.4, 455/575.1, 575.8, 412.2, 413, 420, 415, 567, 455/90.3; 379/330, 428.01, 447
See application file for complete search history.

(56) References Cited

U.S. PATENT DOCUMENTS

| | | | |
|---|---|---|---|
| 5,960,079 A * | 9/1999 | Prunier et al. | 379/433.05 |
| 6,341,227 B1 * | 1/2002 | Moster et al. | 455/550.1 |
| 6,453,169 B1 * | 9/2002 | Maloney | 455/575.1 |
| 6,463,262 B1 * | 10/2002 | Johnson et al. | 455/90.1 |
| 6,539,208 B1 * | 3/2003 | Mori | 455/575.3 |
| 6,728,558 B1 * | 4/2004 | Kubo et al. | 455/575.4 |
| 6,950,516 B2 * | 9/2005 | Pirila et al. | 379/433.12 |
| 2010/0302716 A1 * | 12/2010 | Gandhi | 361/679.01 |

FOREIGN PATENT DOCUMENTS

| | | |
|---|---|---|
| DE | 102005005035 A1 | 8/2006 |
| EP | 0536578 A2 | 4/1993 |
| EP | 1301011 A2 | 4/2003 |
| JP | 2004072285 A * | 3/2004 |
| WO | 2008 009782 A2 | 1/2008 |

OTHER PUBLICATIONS

International Search Report Dated Aug. 31, 2009.

* cited by examiner

*Primary Examiner* — Minh D Dao
(74) *Attorney, Agent, or Firm* — Perman & Green, LLP

(57) ABSTRACT

A device with a base housing part and two slidably suspended cover parts that can move in opposite directions between a retracted position in which they substantially abut one another and conceal an operating face and an extended position in which they do not conceal the operating face. At least one of the covers can also assume an intermediate position between the retracted position and the extended position in which in which a portion of the operating face is not concealed.

18 Claims, 5 Drawing Sheets

ELECTRONIC DEVICE WITH MOVABLE HOUSING PARTS

FIELD

The aspects of the disclosed embodiments relate to mobile electronic devices that include a housing having at least three housing parts that are movable relative to one another, in particular to mobile electronic devices that have at least three housing parts that are movable relative to one another to conceal and unconceal an operating face.

BACKGROUND

Mobile electronic devices with two housing parts that can be moved between a retracted position in which a keypad is concealed and an extended position in which the keypad is not concealed are known in the art.

There is often a need to protect the display of the mobile device from being scratched or damaged and there is also a need to check right away who is calling, but many times the user cannot take the call at that specific moment, but can call back later. This problem is the same for SMS and MMS and e-mail. There is also a need to have devices that look sophisticated and are relatively small in size, especially when they are carried and not in use.

DISCLOSURE

On this background, the aspects of the disclosed embodiments provide a mobile electronic device that at least partially overcomes the above problems. In one embodiment, a device comprises a housing having at least a base part, a first cover part, and a second cover part, the base part is provided with an operating face, the first cover part being mounted for slidable movement relative to base part between a retracted position in which it conceals a portion of operating face and an extended position in which it does not cover a portion of the operating face, the second cover part being mounted for slidable movement relative to base part between a retracted position in which it conceals a portion of the operating face and an extended position in which it does not cover a portion of the operating face, at least one of the cover parts being configured to assume an intermediate position between the retracted position and the extended position in which a portion of the operating face is not concealed.

By providing a device in which one of the covers can assume an intermediate position, a device is provided that protects the operating face, whilst it is possible to unconceal a small portion of the operating face quickly, and it is possible to unconceal the complete operating face an immediate following step.

The first cover part and the second cover part slide in substantially opposite directions to their respective retracted and extended positions.

The device can be configured to move one of the cover parts from its retracted position to its intermediate position in response to a first signal whilst the other cover part is kept in the retracted position.

The device can be configured to move the one cover part from its intermediate position to its extended position and to move the other cover part from its retracted position to its extended position in response to a second signal following the first signal.

The cover parts can be urged in the direction of respective extended positions by resilient means.

Locking mechanisms may prevent the cover parts from being moved from the retracted position or the intermediate position.

The locking mechanisms can be released upon the first or second signal, which may be caused by the activation of a key.

The operating face may include a display and the caller ID is displayed in the visible part of the display when the first signal is received during an incoming call.

Preferably, the incoming call is answered when the second signal is received during an incoming call.

The first and second signal can be generated by the activation of a key that is not placed in the operating face.

The first and second cover parts may abut one another when they are both in their retracted positions.

The object above is also achieved by providing a device comprising a base housing part and two slidably suspended cover parts that can move in opposite directions between a retracted position in which they substantially abut one another and conceal an operating face and an extended position in which they do not conceal the operating face, whereby at least one of the covers can also assume an intermediate position between the retracted position and the extended position in which in which a portion of the operating face is not concealed.

In one embodiment, a method for operating a device that comprises a base housing part and two slidably suspended cover parts that can move in opposite directions between a retracted position in which they substantially abut one another and conceal an operating face and an extended position in which they do not conceal the operating face, comprises bringing one of the cover parts from the retracted position into an intermediate position between the retracted position and the extended position in which a portion of the operating face is not concealed upon receipt of the first signal whilst the other cover part is kept in the retracted position, and moving the one cover part from the intermediate position to its extended position and moving the other cover part from its retracted position to its extended position upon receipt of a second signal.

The caller ID can be displayed on the visible part of a display on the operating face when the first signal is received during a call and wherein the call is answered upon receipt of the second signal.

The call can be rejected when the user pushes the one cover part from the intermediate position back to its retracted position after the first signal.

The call can be ended when the user pushes the one and the other cover part back to their retracted position after the second signal.

The message sender ID can be displayed on the visible part of a display on the operating face when the first signal is received after receipt of a message, and wherein the message is displayed upon receipt of the second signal.

Further aspects, features, advantages and properties of the device and method according to the disclosed embodiments will become apparent from the detailed description.

BRIEF DESCRIPTION OF THE DRAWINGS

In the following detailed portion of the present description, the aspects of the disclosed embodiments will be explained in more detail with reference to the exemplary embodiments shown in the drawings, in which.

DETAILED DESCRIPTION OF PREFERRED EMBODIMENTS

In the following detailed description, the device according to the disclosed embodiments in the form of a cellular/mobile phone will be described by the preferred embodiments.

Figure 1:
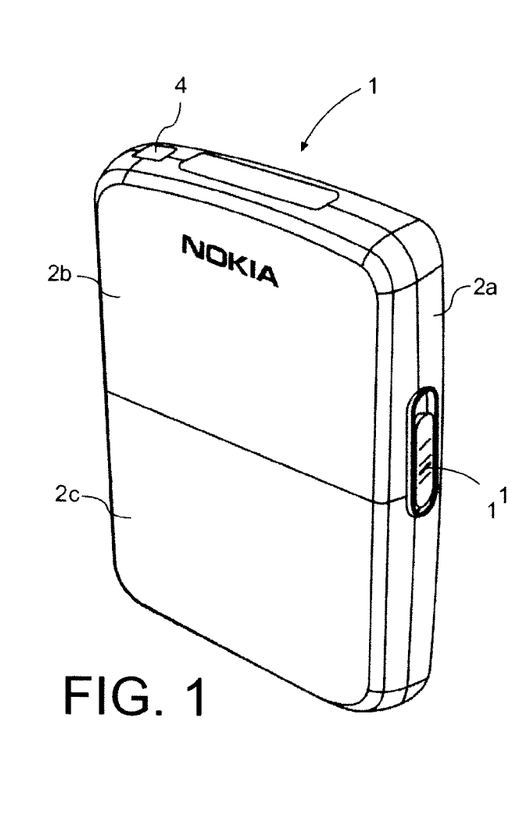
FIG. 1 is an elevated front view of the mobile electronic device according to an embodiment in a compact state.
Figure 2:
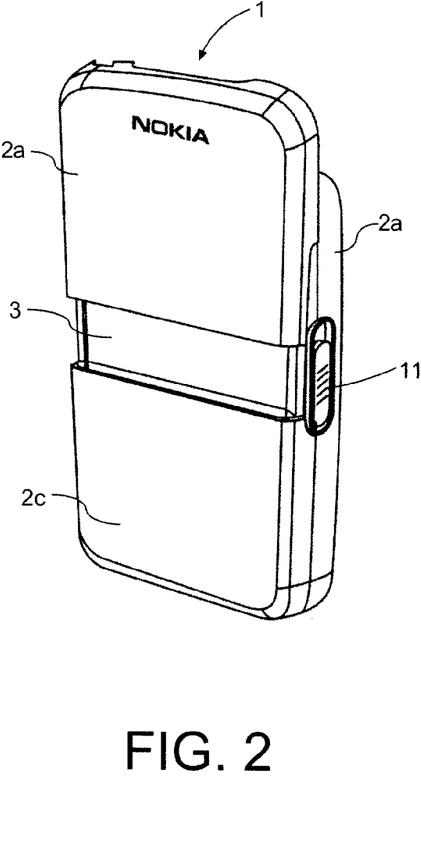
FIG. 2 is an elevated view of the mobile electronic device of FIG. 1 in an intermediate state.
Figure 3:
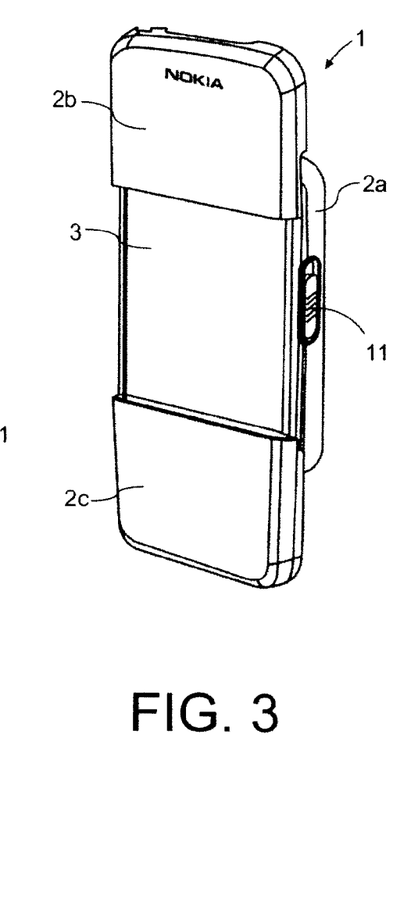
FIG. 3 is an elevated view of the mobile electronic device of FIG. 1 in an extended state.
Figure 4:
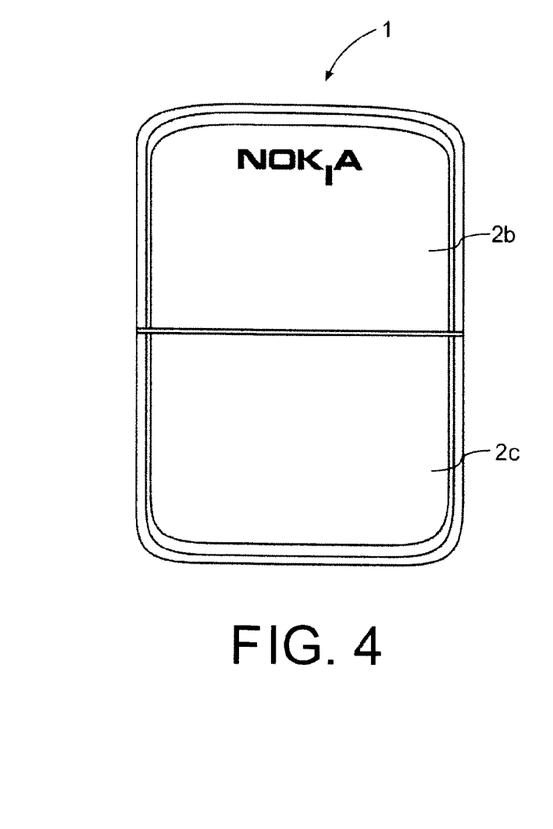
FIGS. 4 to 6 are front views of the mobile electronic device of FIG. 1 in the compact-, intermediate- and compact state.

FIGS. 1 to 3 illustrate a first embodiment of a device according to the disclosed embodiments in the form of a mobile telephone 1 by a series of elevated views. In FIG. 1 the mobile phone 1 is in a compact state, in FIG. 2, the mobile phone is in an intermediate state, and in FIG. 3 the mobile phone is in an extended state. These three states of the mobile phone 1 will be explained in detail further below.

The mobile phone 1 comprises a user interface having a housing, a touch screen display 3, an on/off button 4, a speaker 5 (not shown in FIGS. 1 to 3), and a microphone 6 (not shown in FIGS. 1 to 3). The housing comprises a base part 2a, a first cover part 2b and a second cover part 2c. The phone 1 according to the present embodiment is adapted for communication via a cellular network, such as the GSM 900/1800 MHz network, but could just as well be adapted for use with a Code Division Multiple Access (CDMA) network, a 3G network, or a TCP/IP-based network to cover a possible VoIP-network (e.g. via WLAN, WIMAX or similar) or a mix of VoIP and Cellular such as UMA (Universal Mobile Access).

The touchscreen 3 acts as a virtual keypad and is used for a variety of user input to the device, such as selection and scrolling. The device 1 is also provided with a selection key 11 for controlling the position of the first cover part 2a and the second cover part 2b. The selection key 11 is also used for selecting and activating other functions, as will be described further below. The selection key 11 is not part of the operating face that can be concealed and unconcealed by the cover parts 2b and 2c. The selection key 11 can be on a side of the housing or any other place that is not under the covers parts 2b and 2c, e.g. the selection key 11 (could be a touch sensitive key) can in en embodiment be disposed on top of the covers 2b and 2c).

A releasable rear cover (not shown) gives access to the SIM card 20 (FIG. 10), and the battery pack 24 (FIG. 10) in the back of the phone supplies electrical power for the electronic components of the mobile phone 1.

The mobile phone 1 has a flat display 3 that is typically made of an LCD with optional back lighting, such as a TFT matrix capable of displaying color images with touch screen used on top of the LCD display.

The base part 2a includes most of the electronic components of the mobile phone 1. The first cover part 2b and the second cover part 2c are slidably connected to the base part 2a. The slidable suspension between base part 2a and cover part 2b and 2c is suitably formed by rails and tracks (not shown). Resilient means (not shown) are provided to urge the first cover part 2b towards its extended position and the second cover part 2c towards its extended position.

The first cover part 2b can move in an upward direction between a retracted position that is shown in FIG. 1 in which it conceals approximately half of the touch screen 3 via an intermediate position shown in FIG. 2 to an extended position in FIG. 3. In the retracted position the cover parts 2b and 2c protect the touchscreen display 3 completely and the phone 1 is conveniently small, e.g. when carried or transported and not used. In the intermediate position the first cover part 2b conceals less than half of the touchscreen 3 and a small portion of the touchscreen 3 is visible and accessible to the user. In the extended position the first cover part 2b does not conceal any portion of the touchscreen 3 (or at least the first cover part 2b conceals only a very little portion of the touchscreen 3 in the extended position).

The second cover part 2c can move in a downward direction between a retracted position shown in FIG. 1 in which it conceals approximately half of the touch screen 3 to an extended position shown in FIG. 3 in which it does not conceal any portion of the touchscreen 3 (or at least the second cover part 2c conceals only a very little portion of the touchscreen 3 in the extended position).

A locking mechanism (not shown) automatically locks the first cover part 2b relative to the base part 2a in the retracted position and thereby prevents the first cover part 2b from moving to its extended position under the influence of the resilient means. Another locking mechanism (not shown) automatically locks the second cover part 2c relative to the base part 2a in the retracted position thereby prevents the second cover part 2c from moving to its extended position on the influence of the resilient means.

The locking mechanisms are released by activating the selection key 11 on the side of the mobile phone the mobile phone 1. In an embodiment a first press on the selection key 11 will disengage the locking mechanism for the first cover part 2b and allow it to move under the influence of the resilient means to the intermediate position in which it is locked again. If the selection key 11 is subsequently pressed again, the locking mechanism for the first cover part 2b will allow it to move under the influence of the resilient means from the intermediate position to its extended position. Simultaneously, the second activation of the selection key will release the locking mechanism for the second cover part 2c and allow it to move under the influence of the resilient means from its retracted position to its extended position.

The operation of the locking mechanisms and the selection key 11 will now be described in further detail with reference to FIGS. 4 to 9 in connection with the event of an incoming call by means of two different examples.

The phone is in the compact position (FIG. 4) and an incoming call is signaled. In order to check the incoming call, the user presses the selection key 11. In response to the first pressing of the selection key 11 the first cover part 2b moves (under influence of the resilient means) to its intermediate position and (FIG. 5) and the user can verify the identity of the caller.

Figure 5:
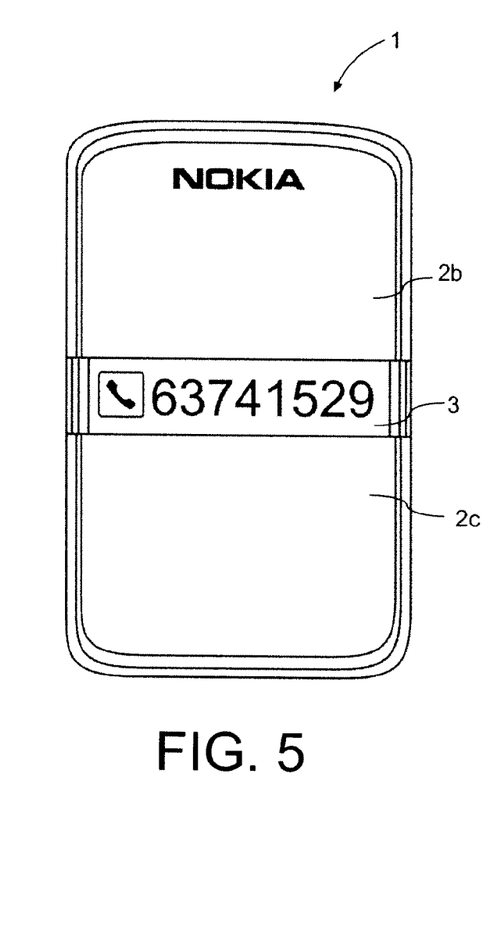
Figure 6:
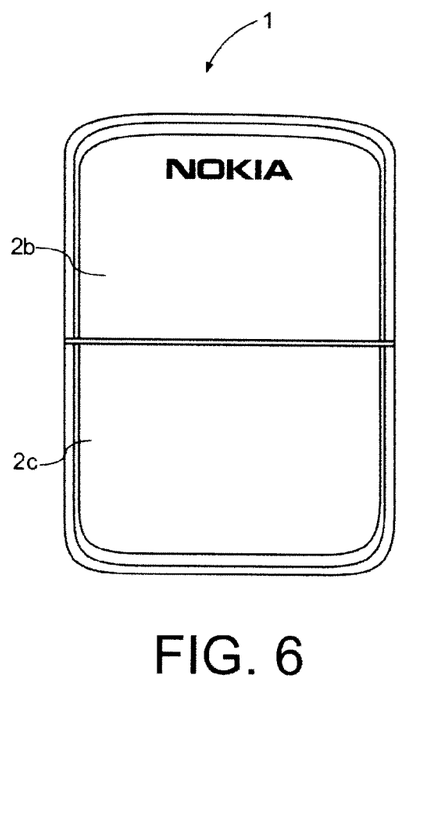

In the present example of FIG. 5, the caller is not known to the user (and not recognized by the phone as a caller that is listed in the phonebook) and the user decides to reject the call by pushing the first cover part 2b back to its retracted position (FIG. 6) and the call is rejected. The locking mechanisms automatically lock when the cover parts are pushed back completely to their respective retracted positions. The phone 1 is now again in its compact state.

Figure 7:
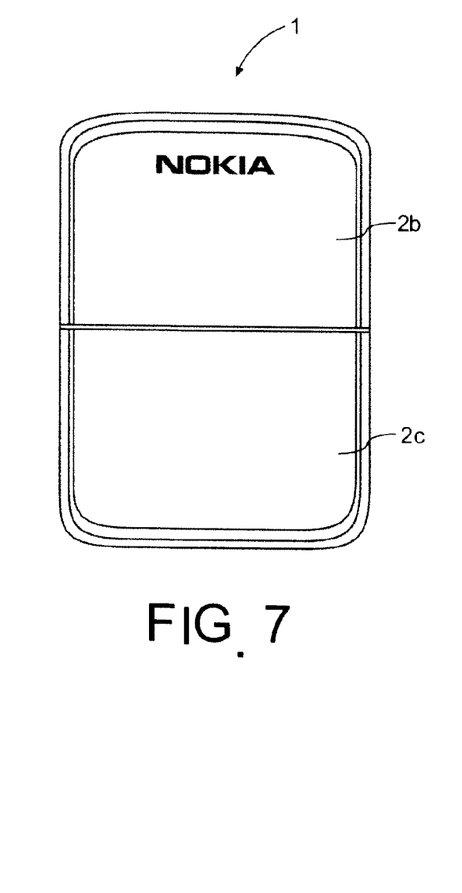
FIGS. 7 to 9 are front views of the mobile electronic device of FIG. 1 in the compact-, intermediate- and extended state.

In FIG. 7 an incoming call is signaled to the user whilst the phone is in the compact state. In order to check the incoming call, the user presses the selection key 11. In response to the first pressing of the selection key 11 the first cover part 2b will move to its intermediate position (FIG. 8) and the user can verify the identity of the caller.

Figure 8:
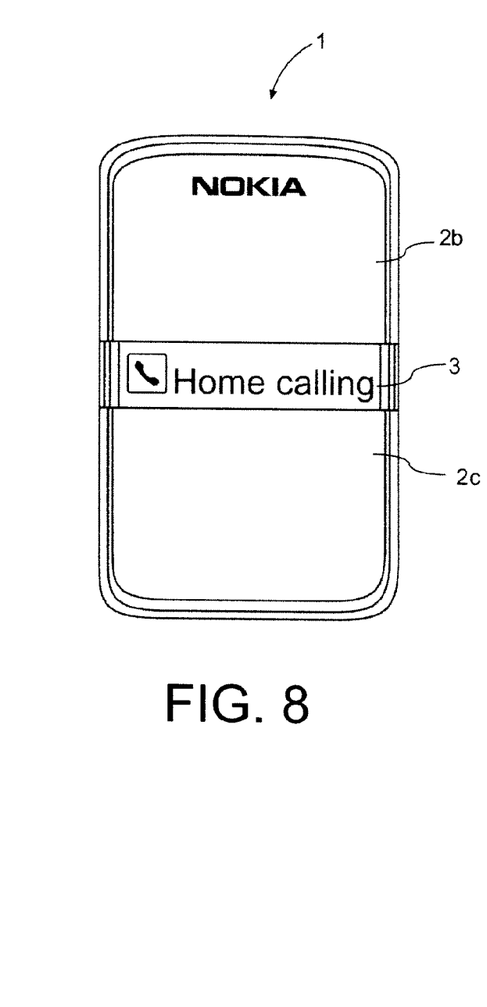

In the present example of FIG. 8 the caller is known to the user and is recognized by the phone has an entry in the phonebook with the name "Home". The user decides to accept the call by pressing the selection key 11 for a second time.

In response the phone 1 allows the first and second cover parts 2a and 2b to move to their respective extended positions (FIG. 9) so that the touchscreen 3 is substantially completely visible and accessible to the user. In the present embodiment the touchscreen 3 shows a picture that is associated with the entry in the phonebook corresponding to the caller ID.

Figure 9:
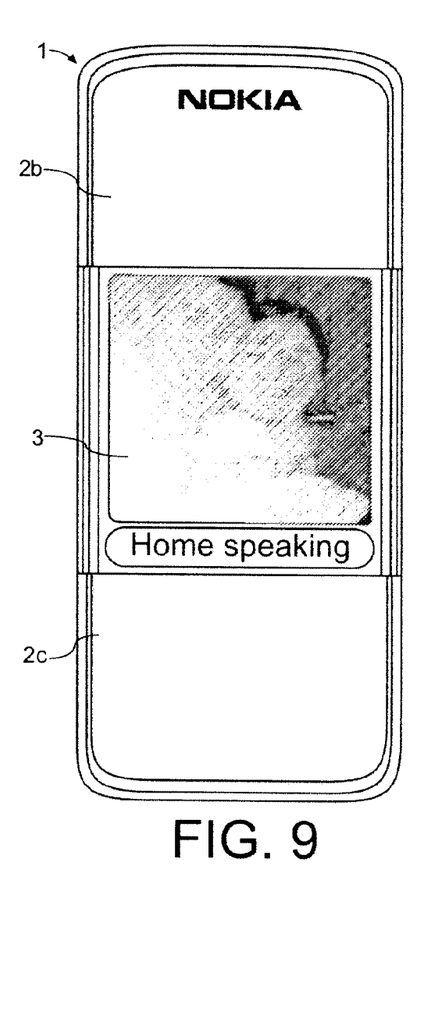

The user can now conduct a call and can end the call by pushing the first and second cover parts 2a and 2b back to their respective retracted positions in which they substantially abut and completely conceal the touchscreen 3. Thereby, the phone has reassumed its compact state.

In order to reassume the compact state, the user will need to push the first cover part 2b and the second cover part 2b against the force of the resilient means to its their retracted positions, where the locking mechanisms will automatically engage.

In the compact position of the mobile phone (FIGS. 1, 4 and 7) the operating face (that is occupied by the display in the present embodiment) is concealed (protected) and not accessible to the user. In the intermediate position of the mobile phone 1, only a small area of the operating face occupied by portion of the display is visible and accessible to the user. In the extended position of the mobile phone 1 the complete operating face is visible and accessible to the user.

The operating face in the above embodiment comprises only a display. However, according to other embodiments (not shown) the operating face includes other user interface components such as keys, keypads, display screens, touchpads, scroll bars and/or the like.

Figure 10:
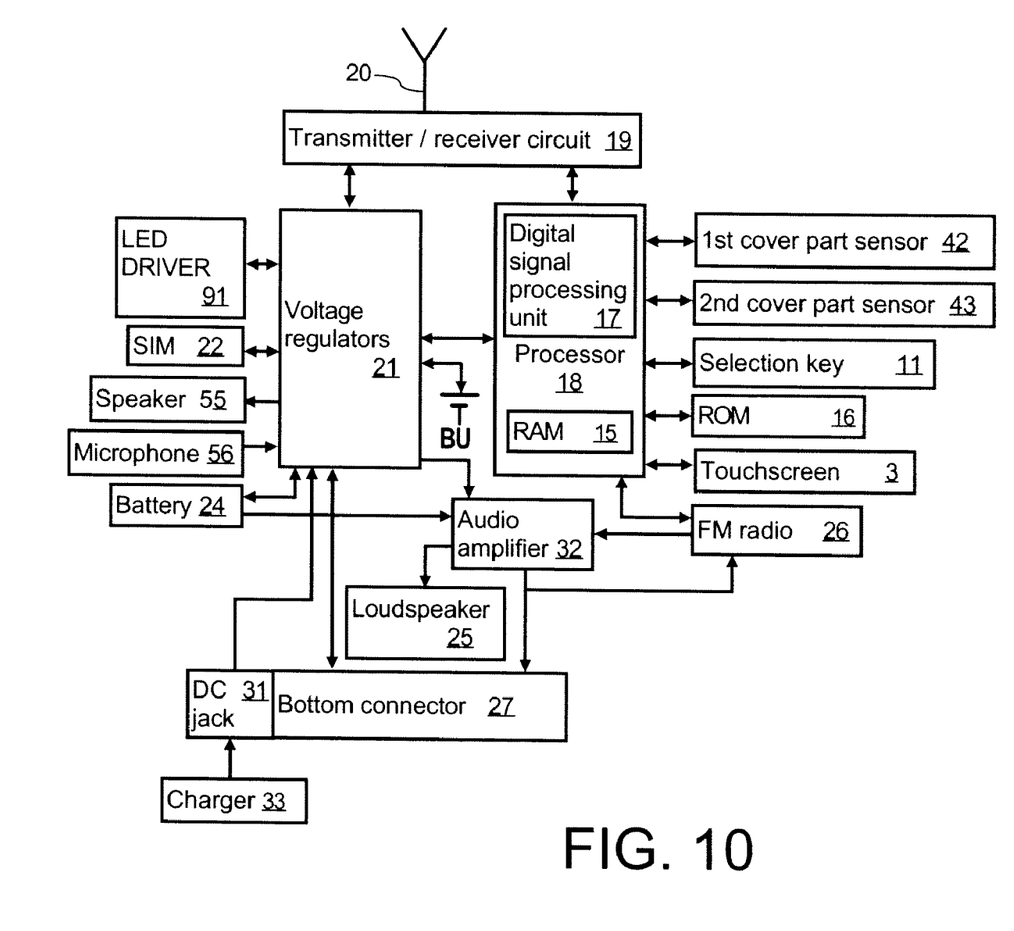
FIG. 10 is a block diagram illustrating the general architecture of a device in accordance with an embodiment.

FIG. 10 illustrates in block diagram form the general architecture of a mobile phone 1 constructed in accordance with the aspects of the disclosed embodiments. The processor 18 controls the operation of the terminal and has an integrated digital signal processor 17 and an integrated RAM 15. The processor 18 controls the communication with the cellular network via the transmitter/receiver circuit 19 and an internal antenna 20. A microphone 6 coupled to the processor 18 via voltage regulators 21 transforms the user's speech into analogue signals, the analogue signals formed thereby are A/D converted in an A/D converter (not shown) before the speech is encoded in the DSP 17 that is included in the processor 18. The encoded speech signal is transferred to the processor 18, which e.g. supports the GSM terminal software. The digital signal-processing unit 17 speech-de-codes the signal, which is transferred from the processor 18 to the speaker 5 via a D/A converter (not shown).

The voltage regulators 21 form the interface for the speaker 5, the microphone 6, the LED drivers 19 (for the LEDS backlighting the touchscreen 3), the SIM card 22, battery 24, the bottom connector 27, the DC jack 31 (for connecting to the charger 33) and the audio amplifier 32 that drives the (hands-free) loudspeaker 25.

The processor 18 also forms the interface for some of the peripheral units of the device, including a Flash ROM memory 16, the touchscreen display 3, the selection key 11, an FM radio 26, a first cover part sensor 42 and a second cover part sensor 43.

The first cover part sensor 42 provides a signal corresponding to the actual position of first cover part 2b relative to the base part 2a, so that the processor 18 can determine whether the first cover part 2b is in its extended, intermediate or in its retracted position.

Similarly, the second cover part sensor 43 provides a signal corresponding to the actual position of second cover part 2c relative to the base part 2a, so that the processor 18 can determine whether the second cover part 2c is in its extended or in its retracted position.

According to an embodiment, the software in the respective memory 15, 16 instructs the processor 18 to control the state of the mobile phone 1 in accordance with the detected positions of the cover parts.

For example, when the processor 18 receives a signal from the first and second cover part sensor 42 and 43 that both cover parts 2b and 2c are in their retracted positions (which means that the phone is in the compact position) it will deactivate the touchscreen to save power and extend battery lifetime.

When the processor 18 receives a signal from the first cover part sensor 43 that the first cover part 2b is in the intermediate or extended position it will initiate an active state for the touchscreen display 3.

When the user subsequently pushes the first and second cover parts 2b and 2c back to their retracted positions the processor 18 deactivate the touchscreen 3.

Figure 11:
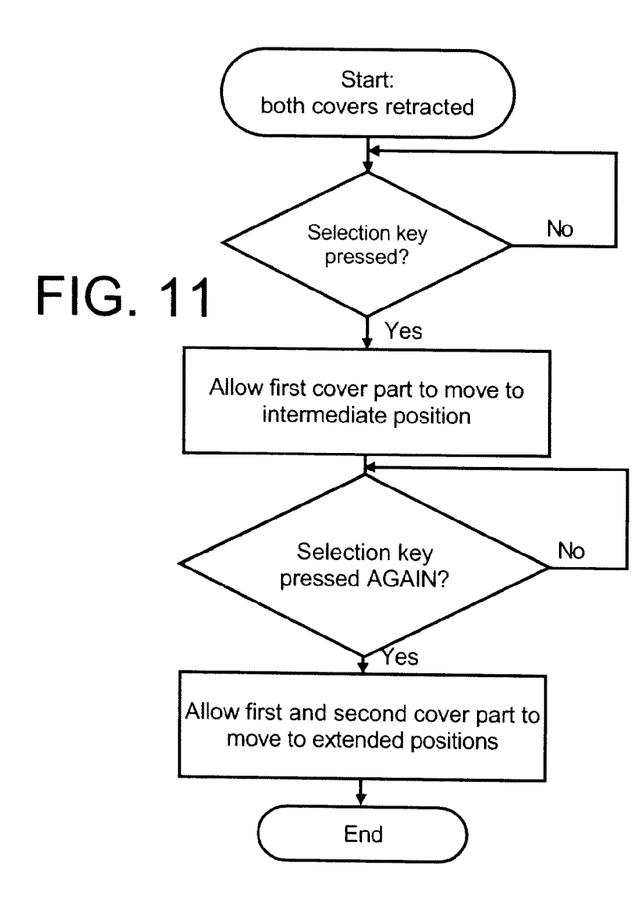
FIG. 11 is a flow chart illustrating an embodiment.

FIG. 11 illustrates an embodiment by means of a flowchart. At the start of the method both cover parts 2b and 2c are in the retracted position. In the next step it is verified whether the selection key 11 is pressed. In practice this verification is done by the processor 18. If the selection key 11 is not pressed the process repeats itself. If the selection key is pressed the processor 18 sends a signal to the locking mechanism to allow the first cover part 2b to move to the intermediate position. Alternatively, the releasing of the locking mechanism is mechanical, i.e. the pressing of the selection key activates a mechanical release.

In the following step it is verified whether the selection key 11 is pressed again. If the section key is not pressed against the process repeats itself until the selection key 11 is pressed or the first cover part 2b is pushed back by the user to the retracted position.

If the first cover part 2b is pushed back by the user to the retracted position the process starts again from start. If the user presses the selection key 11 again the processor 18 allows the first and second cover part 2b and 2c to move to their respective extended positions. If the user thereafter pushes both cover parts back to their retracted positions the process returns to start.

Figure 12:
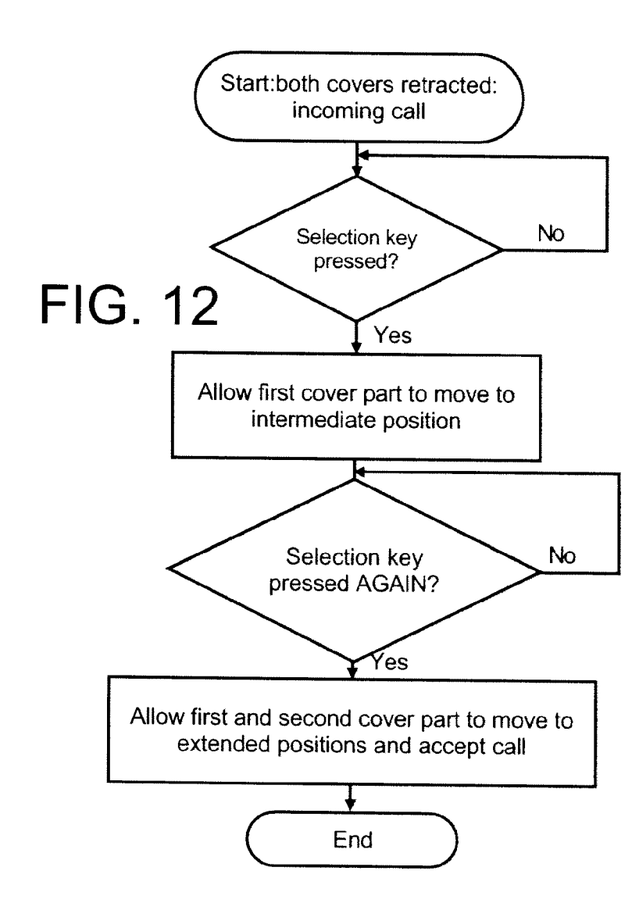
FIG. 12 is a flow chart illustrating another embodiment.

FIG. 12 illustrates another embodiment by means of a flowchart. At the start of the method both cover parts 2b and 2c are in the retracted position during an incoming call. In the next step it is verified whether the selection key 11 is pressed. In practice this verification is done by the processor 18.

If the selection key 11 is not pressed the process repeats itself and the call was not answered. If the selection key is pressed the processor 18 sends a signal to the locking mechanism to allow the first cover part 2b to move to the intermediate position. The call is not yet answered, but the processor ensures that the caller ID is shown in the display 3.

In the following step it is verified whether the selection key 11 is pressed again. If the section key 11 is not pressed against the process repeats itself until the selection key 11 is pressed or the first cover part 2b is pushed back by the user to the retracted position, which means that the call is rejected.

If the first cover part 2b is pushed back by the user to the retracted position the process starts again from start. If the user presses the selection key 11 again the processor 18 allows the first and second cover part 2*b* and 2*c* to move to their respective extended positions and the call is answered. If the user thereafter pushes both cover parts back to their retracted positions the process returns to start and the call is ended.

According to an embodiment the phone 1 moves both cover parts 2*b* and 2*c* to their extended positions when selection key 11 is pressed during an incoming call or shortly after receipt of a message and the ID of an incoming call or message can be matched with information stored in the device, e.g. the ID can be matched with the phonebook stored in the phone.

The various aspects of what is described above can be used alone or in various combinations. The teaching of this application is preferably implemented by a combination of hardware and software, but can also be implemented in hardware or software. The teaching of this application can also be embodied as computer readable code on a computer readable medium. It should be noted that the teaching of this application is not limited to the use for answering calls. The teaching can just as well be used for verifying and answering messages (such as SMS or e-mail) In such an embodiment the message sender ID is displayed on the visible part of the display 3 when the user presses the selection key 11 for the first time after receipt of a message, and the message is displayed when the user as is the selection key 11 for the second time.

The disclosed embodiments can be used also with MP3 players and control different function in those devices.

The aspects of the disclosed embodiments include numerous advantages. Different embodiments or implementations may yield one or more of the following advantages. It should be noted that this is not an exhaustive list and there may be other advantages which are not described herein. One advantage is that the device protects the operating face and allows quick access to a portion of the operating face. There is another advantage that the cover parts can be moved between the retracted, intermediate and extended positions with one hand. Another advantage is that a user is able to control a plurality of state of the mobile phone by a mechanical action of moving a housing part. A third advantage is that the housing can assume a compact position in which it has very small dimensions.

The term "comprising" as used in the claims does not exclude other elements or steps. The term "a" or "an" as used in the claims does not exclude a plurality. The single processor or other unit may fulfill the functions of several means recited in the claims.

Although the aspects of the disclosed embodiments have been described in detail for purpose of illustration, it is understood that such detail is solely for that purpose, and variations can be made therein by those skilled in the art without departing from the scope of the disclosed embodiments. For example, although the embodiments have been described in terms of a mobile phone, it should be appreciated that the embodiments may also be applied to other types of electronic devices, such as cameras, video recorders, music players, palmtop computers and the like It should also be noted that there are many alternative ways of implementing the methods and apparatuses of the teaching of this application. For example, although the sliding covers has been described in terms of covers that move up and down, it should be understood that the covers could be arranged to move sidewards in opposite directions.

The term "comprising" as used in the claims does not exclude other elements or steps. The term "a" or "an" as used in the claims does not exclude a plurality. The single processor or other unit may fulfill the functions of several means recited in the claims.

The invention claimed is:

1. A device comprising:
   a housing having at least a base part, a first cover part, and a second cover part;
   locking mechanisms configured to prevent the cover parts from being moved from respective retracted positions;
   said base part is provided with an operating face;
   said first cover part being mounted for slidable movement relative to base part between the respective retracted position in which it conceals a portion of operating face and an extended position in which it does not cover a portion of the operating face;
   said second cover part being mounted for slidable movement relative to base part between the respective retracted position in which it conceals a portion of the operating face and an extended position in which it does not cover a portion of the operating face; and
   at least one of said cover parts being configured to assume an intermediate position between said retracted position and said extended position in which a portion of said operating face is not concealed, where the locking mechanisms are further configured to prevent the at least one of said cover parts from being moved from the intermediate position;
   wherein the locking mechanisms are released so that the at least one of said cover parts is configured to sequentially move to the intermediate position in response to a first signal and to move to the extended position upon receipt of a second signal.

2. A device according to claim 1, wherein said first cover part and said second cover part slide in substantially opposite directions to their respective retracted and extended positions.

3. A device according to claim 1, wherein the other one of the at least one of said cover parts is kept in the retracted position while the at least one of said cover parts is moved to the intermediate position.

4. A device according to claim 3, said device being configured to move the at least one of the cover parts from its intermediate position to its extended position and to move the other one of the at least one of said cover parts from its retracted position to its extended position in response to the second signal following said first signal.

5. A device according to claim 4 wherein said locking mechanisms are released upon said first or second signal.

6. A device according to claim 4, wherein said operating face includes a display and the caller ID is displayed in the visible part of the display when said first signal is received during an incoming call.

7. A device according to claim 4, wherein said first and second signal are generated by the activation of a key that is not placed in the operating face.

8. A device according to claim 1, wherein said cover parts are urged in the direction of respective extended positions by resilient means.

9. A device according to claim 1, wherein the first and second cover parts abut one another when they are both in their retracted positions.

10. A device comprising;
    a base housing part; and
    two slidably suspended cover parts that can move in opposite directions between a releasably locked retracted position in which they substantially abut one another and conceal an operating face and an extended position in which they do not conceal the operating face, whereby at least one of the covers can also assume an intermediate position between the refracted position and the extended position in which a portion of said operating face is not concealed, where the at least one of the covers is releasably locked in the intermediate position, and wherein the at least one of the cover parts is configured to sequentially move to the intermediate position in response to a first signal and to move to the extended position upon receipt of a second signal.

11. A device according to claim 10, wherein the two cover part slide in substantially opposite directions to their respective retracted and extended positions.

12. A device according to claim 10, said device being configured to move the at least one of the cover parts from its retracted position to its intermediate position in response to a first signal whilst the other cover part is kept in the retracted position.

13. A method for operating a device that comprises a base housing part and two slidably suspended cover parts that are configured to move in opposite directions between a releasably locked retracted position in which they substantially abut one another and conceal an operating face, and an extended position in which they do not conceal the operating face, comprising:

bringing one of the cover parts from the releasable locked retracted position into a releasably locked intermediate position between the releasably locked retracted position and the extended position in which a portion of said operating face is not concealed upon receipt of a first signal whilst the other cover part is kept in the releasably locked retracted position, and moving the one cover part from the releasably locked intermediate position to its extended position and moving the other cover part from its releasably locked retracted position to its extended position upon receipt of a second signal, where locking mechanisms holding the cover parts in a respective releasably locked position are configured to be released upon said first or second signal.

14. A method according to claim 13, wherein a caller ID is displayed on a visible part of a display on said operating face when said first signal is received during a call and wherein said call is answered upon receipt of said second signal.

15. A method according to claim 14, wherein the call is rejected upon pushing the one cover part from the intermediate position back to its retracted position after said first signal.

16. A method according to claim 14, wherein the call is ended upon pushing the one and the other cover part back to their retracted position after said second signal.

17. A method according to claim 13, wherein a message sender ID is displayed on a visible part of a display on said operating face when said first signal is received after receipt of a message, and wherein the message is displayed upon receipt of said second signal.

18. A method according to claim 13, further comprising moving both cover parts to their extended positions if a first signal is received during an incoming call or shortly after receipt of a message and an ID of an incoming call or message can be matched with information stored in the device.

* * * * *

UNITED STATES PATENT AND TRADEMARK OFFICE
CERTIFICATE OF CORRECTION

| | | |
|---|---|---|
| PATENT NO. | : 8,032,193 B2 | |
| APPLICATION NO. | : 12/175594 | |
| DATED | : October 4, 2011 | |
| INVENTOR(S) | : Xin et al. | |

It is certified that error appears in the above-identified patent and that said Letters Patent is hereby corrected as shown below:

Column 8, line 62, Claim 10, delete "comprising;" and insert -- comprising: --, therefor.

Column 9, line 3, Claim 10, delete "refracted" and insert -- retracted --, therefor.

Signed and Sealed this
Thirty-first Day of January, 2012

David J. Kappos
*Director of the United States Patent and Trademark Office*